Dec. 30, 1969 H. A. KNIGHT 3,486,527

COMBINED CHECK VALVE AND CHOKE VALVE DEVICE

Filed Sept. 21, 1967

INVENTOR.
HOMER A. KNIGHT

BY *Ralph W. McIntire, Jr.*

ATTORNEY 3,486,527
COMBINED CHECK VALVE AND CHOKE
VALVE DEVICE
Homer A. Knight, Lexington, Ky., assignor to Westinghouse Air Brake Company, Wilmerding, Pa., a corporation of Pennsylvania
Filed Sept. 21, 1967, Ser. No. 669,510
Int. Cl. F01l 9/02
U.S. Cl. 137—513.3                   3 Claims

ABSTRACT OF THE DISCLOSURE

A first member is disposed for telescopic movement within a second member and is spring biased to an outer limit whereby a choke valve in the form of an axially-extending integral end portion thereof is tapered for disposition within a correspondingly tapered opening of a first fluid passage to control the rate of fluid flow from a second fluid passage past the choke valve into the first passage as determined by the depth to which the second member is threadedly received in a mounting bore forming a junction between both passages and disposed in coaxial relationship with the first passage. The first member operates as a check valve when telescopically depressed against the spring bias to open the first passage in response to fluid flow from the first passage to the second passage.

---

Figure 1:
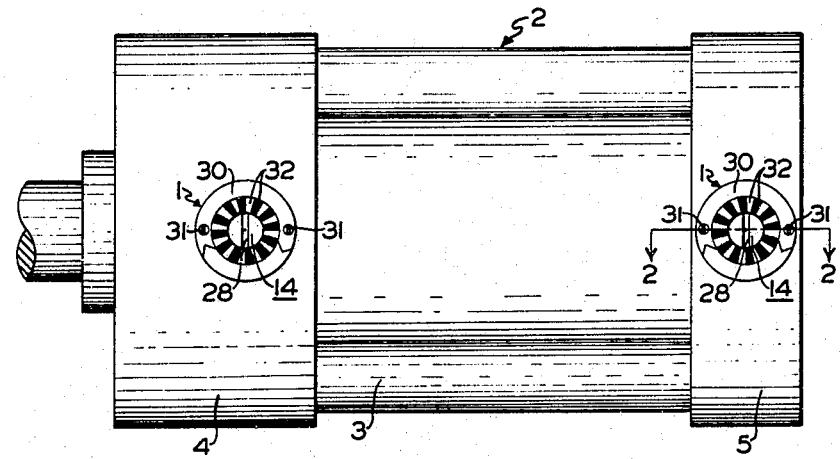

It is the object of this invention to provide a combined check valve and choke valve device which is easily adjusted, and comprised of a minimum number of easily assembled components.

In this invention, this object is achieved by disposing a first member for telescopic movement within a bottom bore in a second member, and providing spring means between the first and second members biasing the first member outwardly into engagement with a stop or limit member comprised of a snap ring disposed at the mouth of the bottom bore. The first member includes an axially extending integral member protruding outwardly of the second member and terminating at its free end in an enlarged head portion axially tapered toward its free end for disposition in a correspondingly tapered opening of a fluid pressure passage, thereby choking the flow of fluid past the valve into the passage opening by an amount depending upon the size of the space between the valve head and the passage opening. In order to change the size of the aforementioned space, the second member is provided with threads on the lower end portion of its exterior adapting the same for axial adjustment in a correspondingly threaded mounting bore which coaxially intersects the opening to the fluid pressure passage whereby threading the second member relatively inwardly or outwardly of the threaded mounting bore correspondingly axially inserts or withdraws the choke valve relative to the passage opening. When the fluid pressure within the first passage exceeds the spring biasing force, the first member is telescoped within the second member, thus operating as a check valve to open the first passage. An O-ring seal is provided in a groove on the unthreaded portion of the exterior of the second member to prevent fluid flow past the device to atmosphere, and to provide frictional means retaining the second member in its axially adjusted position relative to the mounting bore.

Figure 2:
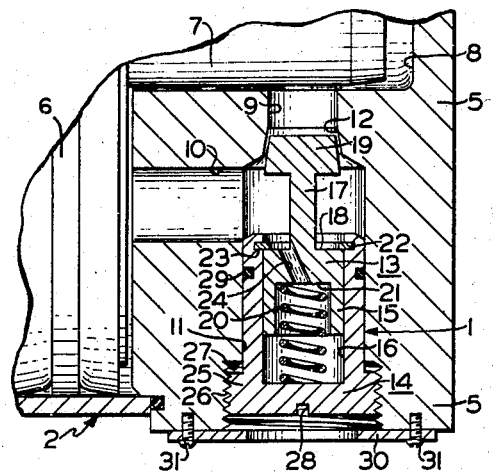

This and other objects will be more readily apparent in the following description, taken with the drawing, in which:

FIG. 1 is a top plan view of a cylinder showing the combined check valve and choke valve installed therein, and FIG. 2 is an enlarged sectional view thereof taken substantially along the line 2—2 of FIG. 1.

Although it is to be understood that the present invention finds utility when used in a wide variety of fluid pressure systems which require both check valve and choke valve operation, the present invention is shown and described, by way of example only, as installed in a fluid power cylinder as an ideal illustration of the utility, function and purpose of the invention.

Referring now to the drawing, there is shown an identical pair of combined check valve and choke valve devices 1, 1 of the present invention as installed in a fluid power cylinder device 2.

The fluid power cylinder may be of any conventional commercially available type, and generally comprises a cylinder body 3, a pair of cylinder heads 4 and 5 attached to the opposite ends of the body by any suitable means, not shown, a fluid pressure operated piston assembly 6 disposed for reciprocable movement in the cylinder body, an axially extending boss 7 on said piston and slidably received with close tolerance in a cavity 8 in the cylinder head, passage means 9, 10 within the cylinder head intercommunicating the cylinder body cavity with the head cavity, and a combined supply and exhaust cavity, not shown, disposed in the cylinder head for selectively supplying or exhausting fluid pressure to or from the head cavity 8. It is to be understood that when cylinder boss 7 enters cavity 8 at the end of the piston stroke in response to pressure applied to the opposite side of the piston 6, the boss 7 substantially seals the cavity 8 relative to the cylinder bore so that fluid compressed between the piston assembly and the internal face of the cylinder head is forced through passages 9, 10 to the cavity 8 and its associated supply-exhaust port at a rate determined by the chocking action of the combined check valve and chock valve device hereinafter to be described in detail. Alternatively, at the beginning of the piston stroke, as effected by the application of fluid pressure to the supply-exhaust port in cylinder head 5, fluid under pressure is supplied to head cavity 8, through passages 9 and 10, and the combined check valve and choke valve of the hereinafter described invention, to the cylinder bore to apply full pressure on the face of piston assembly 6.

The combined check valve and choke valve device 1 is adapted to be installed in a mounting bore 11 in the cylinder head 5, which mounting bore intersects and provides a junction between the passages 9, 10 preferably in such fashion as to be coaxially aligned with the tapered opening 12 of passage 10 formed at the junction between passage 10 and mounting bore 11.

In now describing the invention, it will be seen by reference to FIG. 2 of the drawing, that the combined choke valve and check valve device comprises a first member, generally indicated at 13, disposed for axial telescopic movement relative to a second member, generally indicated at 14.

The first member 13 is comprised of three integral portions, which are, a lower cylindrical end portion 15 disposed for close tolerance telescopic movement entirely within a bottomed bore 16 axially disposed in the second member 14, an axially extending intermediate portion 17 necked relative to the aforementioned lower end portion to form a shoulder 18 therebetween, and an upper end or head portion 19 comprising a choke valve member which is radially enlarged relative to the intermediate portion and is axially tapered toward its upper end in correspondence with the taper of the aforementioned passage opening 12.

A spring member 20 is compressed between the bottom bore 16 in the second member and a bottom bore 21 in the lower end of the lower end portion 15 of the first member 13 to normally urge the first member upwardly to engage shoulder 18 with an upper limit member 22 on the second member 14, which limit may comprise an annular inwardly extending shoulder located at the mouth of the bottomed bore 16, which shoulder, for example, may comprise a snap ring, as shown, disposed on an inner shoulder 23 and fixed in position by staking or peening thereover the upper end of the second member 14. A passage 24 in lower end portion 15 of the first member 13 communicates bottom bore 21 with shoulder 18, thus pressure balancing the first member 13 to eliminate dash-pot action thereof when externally applied pressure retracts member 13 within member 14.

In order to effect axial adjustment of the second member 14, and thereby to correspondingly effect axial adjustment of the choke valve member 19 relative to the passage opening 12 to vary the rate of fluid flow from passages 9, 10 to the head cavity 8, the lower end portion of the second member 14 is radially enlarged and provided with exterior threads 25 which engage with corresponding threads 26 in a counterbore 27 of mounting bore 11. The lower end of the second member 14 is provided with means such as a traverse slot 28 in which a tool such as a screwdriver may be inserted to rotate the second member 14 to effect the aforementioned axial adjustment thereof.

In order to seal the mounting bore 11 to prevent escape of fluid from passage 9, 10 around the second member 14 to atmosphere, and, at the same time and by the same means provide a frictional engagement between the second member 14 and bore 11 to inhibit movement of the second member in response to vibration of the cylinder during operation, an O-ring seal 29 is disposed in an annular groove on the unthreaded portion of the second member 14 for lateral compression between the second member 14 and the wall of bottom bore 11.

In order to provide an outer limit for axial movement of the second member 14, an annular plate 30 is fixed on the exterior of the cylinder heads 4 and 5 as by screws 31 to partially overlie counterbore 27, thereby providing a stop member engageable by the lower end of the second member 14. If desired, the outer face of the annular plate may be provided with suitable indicia 32 indicating a plurality of incremental positions for the slot 28 and also the direction of rotation of the slot for decreasing and increasing the rate of flow of fluid around the choke valve member 19.

In the assembly and installation of the above described invention, the combined choke valve and check valve device 1 is fully assembled, and thereafter inserted in mounting bore 11. By threading second member 14 to any selected depth with the mounting bore, the choke valve member 19 of the now fully extended first member 13 is inserted within the tapered opening 12 of passage 10 a desired amount to control the rate of fluid flow from passage 9 to passage 10. The seal ring 29 frictionally holds the second member 14 in any selected axial position.

In now describing the operation of the device, if it is assumed that the pressure in passage 10 predominates over that in passage 9, as will occur in the present illustration when the piston 6 approaches the end of its stroke with boss 7 inserted in head cavity 8, the rate of fluid flow from the cylinder bore through passage 10, around choke valve member 19, through passage 9 and head cavity 8 to exhaust is determined by the size of the space between choke valve 19 and opening 12 of passage 10, which space size is initially determined by the depth to which the second member 14 is threadedly inserted in mounting bore 11. In this manner, the termination of the piston stroke is cushioned by an amount determined by the axial adjustment of the second member 14 within the mounting bore 11.

Conversely, if the fluid pressure in passage 9 predominates over that in fluid passage 10 by an amount exceeding the biasing force of spring 20, as will occur when fluid under pressure is supplied to head cavity 8 to effect a return stroke of the piston 6, such fluid pressure impinges on the end face of choke valve member 19, which pressure is transmitted through the first member 13 to compress spring 20 and retract the pressure balanced first member 13 within the second member 14 to thereby open passage 10 to allow a rapid flow from head cavity 8 through passages 10 and 9 to impinge upon the face of piston 6.

Having now described the invention, what I claim as new and desire to secure by Letters Patent is:

1. In a housing having a combined fluid pressure and exhaust passage therein for selectively passing fluid therethrough in one direction under supply pressure and in the opposite direction under exhaust pressure, and a mounting bore therein threaded at the outer end portion thereof and coaxially communicating with a portion of said passage, a combined check valve and choke valve device, comprising:
   (a) a first member having a lower end portion, an upper end portion and an intermediate necked portion forming a radial shoulder between said intermediate portion and said lower end portion,
   (b) a second member having a bottomed bore axially disposed therein,
   (c) said lower end portion of said first member disposed for axial telescopic movement within said bottomed bore between an upper limit in which said first member is fully extended toward said portion of said passage in the exhaust pressure direction and a lower limit in which said first member is fully retracted in the supply pressure direction,
   (d) said upper limit comprising means on said second member radially overlying said bottom bore for engagement by said radial shoulder,
   (e) a spring in said bottomed bore biasing said first member to said upper limit,
   (f) said second member having an upper end portion adapted for close tolerance axial movement in said mounting bore and having threads on the lower end of the exterior thereof for cooperating with said threads in said mounting bore for effecting axial adjustment thereof in said mounting bore,
   (g) said upper end of said first member comprising a choke valve member having an axial taper toward the free end thereof for gradually increasing or decreasing the radial flow area between said choke valve member and said portion of said passage during fluid flow in said exhaust pressure direction in accordance with selective axial adjustment of said second member relative to said mounting bore, and
   (h) a passage in said first member communicating said bottomed bore with said combined supply and exhaust passage upstream of said choke valve member in said exhaust direction and downstream of said valve member in said supply direction.

2. The combined check valve and choke valve, as recited in claim 1, in which said upper limit comprises:
   (a) a peripheral groove on said second member opening to said bottomed bore, and
   (b) a snap ring in said groove radially overlying said bottomed bore.

3. The combined check valve and choke valve device as recited in claim 1, in which, said upper end portion of said second member includes a circumferential exterior groove carrying an annular sealing member therein for frictionally engaging said groove and the wall of said mounting bore.

(References on following page)

References Cited

UNITED STATES PATENTS

| | | | |
|---|---|---|---|
| 1,541,757 | 6/1925 | Allen | 251—83 X |
| 1,641,892 | 9/1927 | Lane | 137—524 X |
| 2,908,288 | 10/1959 | Carr et al. | 137—524 X |
| 3,097,660 | 7/1963 | Priesmeyer | 251—276 X |
| 3,173,649 | 3/1965 | Bryant | 251—282 |
| 3,181,561 | 5/1965 | Schaller | 137—513.5 X |
| 3,376,892 | 4/1968 | Stacey | 137—512.5 X |
| 3,196,753 | 7/1965 | Maurer | 91—26 |
| 3,303,746 | 2/1967 | Schmoeger | 91—26 |

WILLIAM F. O'DEA, Primary Examiner

D. J. ZOBKIW, Assistant Examiner

U.S. Cl. X.R.

91—26; 137—524; 138—46; 251—83, 278